(12) United States Patent
Tang et al.

(10) Patent No.: US 9,201,847 B2
(45) Date of Patent: Dec. 1, 2015

(54) COMPOSITE FINITE FIELD MULTIPLIER

(75) Inventors: Shaohua Tang, Guangzhou (CN); Haibo Yi, Guangzhou (CN)

(73) Assignee: SOUTH CHINA UNIVERSITY OF TECHNOLOGY (CN)

( * ) Notice: Subject to any disclaimer, the term of this patent is extended or adjusted under 35 U.S.C. 154(b) by 209 days.

(21) Appl. No.: 14/123,761

(22) PCT Filed: May 25, 2012

(86) PCT No.: PCT/CN2012/076053
§ 371 (c)(1),
(2), (4) Date: Dec. 3, 2013

(87) PCT Pub. No.: WO2013/034000
PCT Pub. Date: Mar. 14, 2013

(65) Prior Publication Data
US 2014/0101220 A1 Apr. 10, 2014

(30) Foreign Application Priority Data
Sep. 9, 2011 (CN) .......................... 2011 1 0267272

(51) Int. Cl.
*G06F 17/10* (2006.01)
*G06F 7/72* (2006.01)

(52) U.S. Cl.
CPC ................ *G06F 17/10* (2013.01); *G06F 7/724* (2013.01); *G06F 2207/7209* (2013.01)

(58) Field of Classification Search
None
See application file for complete search history.

(56) References Cited

U.S. PATENT DOCUMENTS

| 5,931,894 A * | 8/1999 | Wei | G06F 7/724 |
| | | | 708/492 |
| 6,263,470 B1 * | 7/2001 | Hung | H03M 13/1515 |
| | | | 714/759 |

(Continued)

FOREIGN PATENT DOCUMENTS

| CN | 101095102 | 12/2007 |
| CN | 101739233 | 6/2010 |

(Continued)

OTHER PUBLICATIONS

Mar. 14, 2013, International Search Report PCT/CN2012/076053.

(Continued)

*Primary Examiner* — Michael D Yaary
(74) *Attorney, Agent, or Firm* — Neifeld IP Law, PC

(57) ABSTRACT

A composite finite field multiplier is disclosed. The multiplier includes a controller, an input port, an output port, a $GF((2^n)^2)$ multiplier, a $GF(2^n)$ standard basis multiplier, and a $GF(2^n)$ look-up table multiplier; the controller is connected respectively to the input port, the output port, the $GF((2^n)^2)$ multiplier, the $GF(2^n)$ standard basis multiplier and the $GF(2^n)$ look-up table multiplier; the $GF((2^n)^2)$ multiplier is connected respectively to the $GF(2^n)$ standard basis multiplier and the $GF(2^n)$ look-up table multiplier. By using the $GF((2^n)^2)$ multiplier, the $GF(2^n)$ standard basis multiplier and the $GF(2^n)$ look-up table multiplier, the multiplication of three operands is realized. Compared with the existing multiplier, the multiplier of the present invention has significant advantages in the speed of multiplying three operands over $GF((2^n)^m)$.

6 Claims, 3 Drawing Sheets

(56) References Cited

U.S. PATENT DOCUMENTS

| | | | |
|---|---|---|---|
| 6,701,336 B1 | 3/2004 | Shen et al. | |
| 7,464,128 B1* | 12/2008 | Pitsianis | G06F 7/724 708/492 |
| 8,200,734 B1* | 6/2012 | Asher | G06F 7/724 708/492 |
| 2003/0135530 A1* | 7/2003 | Parthasarathy | G06F 7/724 708/492 |
| 2012/0170738 A1* | 7/2012 | Lablans | H03M 13/158 380/28 |

FOREIGN PATENT DOCUMENTS

| | | |
|---|---|---|
| CN | 101819519 | 9/2010 |
| CN | 102314330 | 1/2012 |
| CN | 202217262 | 5/2012 |

OTHER PUBLICATIONS

Written Opinion PCT/CN2012/076053—Chinese.
Written Opinion PCT/CN2012/076053—English.

\* cited by examiner

COMPOSITE FINITE FIELD MULTIPLIER

CROSS REFERENCE TO RELATED APPLICATIONS

This application is a national stage entry of PCT/CN2012/076053, filed May 25, 2012, which published as WO 2013/034000 on Mar. 14, 2013 in a language other than English, which claims the benefit of CN Application No. CN 201110267272.4, filed Sep. 9, 2011.

FIELD OF THE INVENTION

The present invention relates generally to a device for multiplying elements of a composite finite field, and more particularly to a multiplier for multiplying three operands of a composite finite field.

BACKGROUND OF THE INVENTION

A finite field is a field containing only a finite number of elements, which is widely used in various engineering fields. At present, based on different design basis, multiplication over a finite field are mainly divided into four types: multiplication on the standard basis, multiplication on normal basis, multiplication on double basis, and multiplication on triangular basis.

A composite finite field is a special form of the finite field, and the composite finite field $GF((2^n)^m)$ is the isomorphic form of the finite field $GF(2^{n \times m})$, which is effectively used in various cryptographic applications and encoding techniques. Effective multiplication design over the composite finite field plays a vital role in the implementation of cryptographic algorithms. There are a variety of known multipliers over composite finite fields in prior art, including software multiplier and hardware multiplier, both of which are devices for performing multiplication of two operands.

The multiplication of three operands is widely used in solving mathematical problems and engineering fields, for example, solving of the Oil and Vinegar polynomial which is commonly used in the cryptographic field. The structure of the Oil and Vinegar polynomial includes a plurality of multiplications of three operands as follows:

$$\sum_{i \in O_l, j \in S_l} \alpha_{ij} x_i x_j + \sum_{i,j \in S_l} \beta_{ij} x_i x_j + \sum_{i \in S_{l+1}} \gamma_i x_i + \eta.$$

The Oil and Vinegar polynomial is the most common form of polynomial in multivariate public key cryptosystem. Each individual element of this polynomial is an element of the computing domain. When calculating the value of the Oil and Vinegar polynomial, especially the first two terms of $\alpha_{ij} x_i x_j$ and $\beta_{ij} x_i x_j$, the multiplication of three operands may be used for many times. The multiplication of three operands is not limited to this.

The existing techniques for solving the multiplication of three operands are realized by multipliers of two operands. However, under real-time and speed-sensitive circumstances, there is a need to use specific hardware devices to implement multiplication of three operands.

SUMMARY OF THE INVENTION

Therefore, in order to address the deficiencies and inadequacies in the art, the present invention aims to provide a high-speed composite finite field multiplier for multiplying three operands.

The object of the invention is achieved by the following technical solutions.

A composite finite field multiplier, including:

an input port, configured to input an operand a(x), an operand b(x), an operand c(x), an irreducible polynomial p(x) selected over the $GF(2^n)$ field, an irreducible polynomial q(x) selected over the $GF((2^n)^m)$ field and a control signal k;

a $GF(2^n)$ standard basis multiplier, configured to implement the multiplication $(a(x) \times b(x) \times c(x)) \bmod(p(x))$ of the three operands a(x), b(x) and c(x) on the standard basis over $GF(2^n)$;

a $GF(2^n)$ look-up table multiplier, configured to implement the multiplication $(a(x) \times b(x) \times c(x)) \bmod(p(x))$ of the three operands a(x), b(x) and c(x) based on the look-up table over $GF(2^n)$;

a $GF((2^n)^2)$ multiplier, including a first processor and a scheduler interconnected with each other; the first processor is configured to implement the multiplication $(a(x) \times b(x) \times c(x)) \bmod(q(x))$ of the three operands a(x), b(x) and c(x) over $GF((2^n)^2)$, wherein "mod" represents modular operation; the scheduler is configured to call the $GF(2^n)$ standard basis multiplier and the $GF(2^n)$ look-up table multiplier;

a controller, configured to control the $GF((2^n)^2)$ multiplier, the $GF(2^n)$ standard basis multiplier and the $GF(2^n)$ look-up table multiplier;

an output port, configured to output the results;

the controller is connected respectively to the input port, the output port, the $GF((2^n)^2)$ multiplier, the $GF(2^n)$ standard basis multiplier and the $GF(2^n)$ look-up table multiplier;

the $GF((2^n)^2)$ multiplier is connected respectively to the $GF(2^n)$ standard basis multiplier and the $GF(2^n)$ look-up table multiplier.

The first processor includes an XOR gate circuit for processing the addition operation over the $GF(2^n)$ field.

The control signal k is a (2-bit) value, and has four types of binary value, i.e. $(00)_2$, $(01)_2$, $(10)_2$ and $(11)_2$.

The controller includes a parser and a second processor interconnected with each other;

the parser is configured to parse the inputted control signal;

the second processor is configured to receive the data signal from the input port, and, according to a parsing result from the parser, to notify the $GF((2^n)^2)$ multiplier, the $GF(2^n)$ standard basis multiplier and the $GF(2^n)$ look-up table multiplier to perform a function corresponding to the parsing result.

The operand a(x), operand b(x) and operand c(x) are in the following forms:

$a(x) = a_{n-1} x^{n-1} + a_{n-2} x^{n-2} + \ldots + a_0;$ $b(x) = b_{n-1} x^{n-1} + b_{n-2} x^{n-2} + \ldots + b_0;$ $c(x) = c_{n-1} x^{n-1} + c_{n-2} x^{n-2} + \ldots + c_0.$ The irreducible polynomial p(x) selected over the $GF(2^n)$ field is in the following form:

$p(x) = x^n + p_{n-1} x^{n-1} + p_{n-2} x^{n-2} + \ldots + p_1 x + 1;$

The irreducible polynomial q(x) selected over the $GF((2^n)^m)$ field is in the following form:

$q(x) = q_m x^m + q_{m-1} x^{m-1} + \ldots + q_0;$

Compared with the prior art, the present invention has the following advantages and technical effects.

By using the $GF((2^n)^2)$ multiplier, the $GF(2^n)$ standard basis multiplier and the $GF(2^n)$ look-up table multiplier, the multiplication of three operands is realized. Compared with the existing multiplier, the multiplier of the present invention has significant advantages in the speed of multiplying three operands over $GF((2^n)^m)$, and thus can be widely used in various engineering fields, especially in hardware implementation of cryptographic algorithms and in solving various mathematical problems.

DETAILED DESCRIPTION OF THE PREFERRED EMBODIMENTS

The invention will be better understood with reference to the following description taken in conjunction with the specific embodiments and the accompanying drawings. Accordingly, the scope of the present invention is defined by the appended claims rather than the foregoing description and the exemplary embodiments described therein.

EXAMPLES

Figure 1:
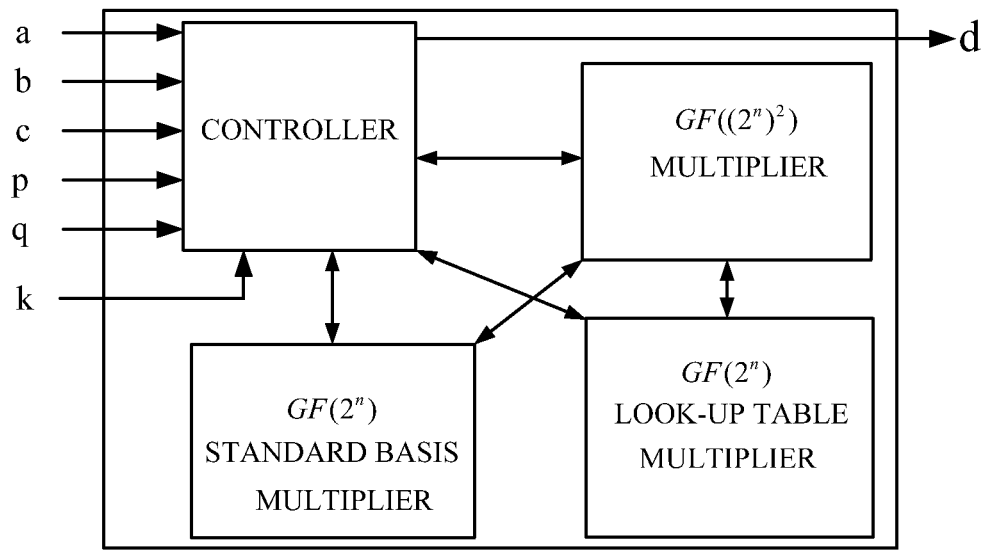
FIG. 1 is a schematic structure chart of the composite finite field multiplier in one embodiment of the present invention.

As illustrated in FIG. 1, the composite finite field multiplier of the present invention includes a controller, input ports, an output port, a $GF((2^n)^2)$ multiplier, a $GF(2^n)$ standard basis multiplier and a $GF(2^n)$ look-up table multiplier; the controller is connected respectively to the input ports, the output port, the $GF((2^n)^2)$ multiplier, the $GF(2^n)$ standard basis multiplier and the $GF(2^n)$ look-up table multiplier; the $GF((2^n)^2)$ multiplier is connected respectively to the $GF(2^n)$ standard basis multiplier and the $GF(2^n)$ look-up table multiplier.

Following is a detailed description of the components of the multiplier of the present invention.

(1) The input ports: as illustrated in FIG. 1, there are six input ports in the embodiment of the invention, including five input ports for inputting data signal and one for control signal, wherein the input ports a, b and c are configured respectively to input three operands $a(x)$, $b(x)$ and $c(x)$; the input ports p and q are configured respectively to input the irreducible polynomial $p(x)$ and $q(x)$ selected over $GF(2^n)$ and $GF((2^n)^m)$; and the input port k is configured to input a control signal.

$a(x)$, $b(x)$, $c(x)$, $p(x)$ and $q(x)$ are in the following forms:

$$a(x) = a_{n-1}x^{n-1} + a_{n-2}x^{n-2} + \ldots + a_0;$$

$$b(x) = b_{n-1}x^{n-1} + b_{n-2}x^{n-2} + \ldots + b_0;$$

$$c(x) = c_{n-1}x^{n-1} + c_{n-2}x^{n-2} + \ldots + c_0;$$

$$p(x) = x^n + p_{n-1}x^{n-1} + p_{n-2}x^{n-2} + \ldots + p_1 x + 1;$$

$$q(x) = q_m x^m + q_{m-1}x^{m-1} + \ldots + q_0;$$

wherein $q_m$, $q_{m-1}$, ..., $q_0$ are elements of $GF(2^n)$, and $a_{n-1}$, $a_{n-2}$, ..., $a_0$, $b_{n-1}$, $b_{n-2}$, ..., $b_0$, $c_{n-1}$, $c_{m-2}$, ..., $c_0$, and $p_{n-1}$, $p_{n-2}$, ..., $p_1$ are elements of $GF(2)$.

The control signal k is a (2-bit) value, which has four types of binary value, i.e. $(00)_2$, $(01)_2$, $(10)_2$ and $(11)_2$.

(2) The output port: as illustrated in FIG. 1, the output port d is configured to output the calculation results $d(x)$ obtained by solving the expression $(a(x) \times b(x) \times c(x)) \bmod(q(x))$, wherein mod represents modular operation;

(3) The controller: as the only component that can communicate with I/O port, the controller is a core component of the multiplier of the present invention, which can control the $GF((2^n)^2)$ multiplier, the $GF(2^n)$ standard basis multiplier and the $GF(2^n)$ look-up table multiplier.

Figure 2:
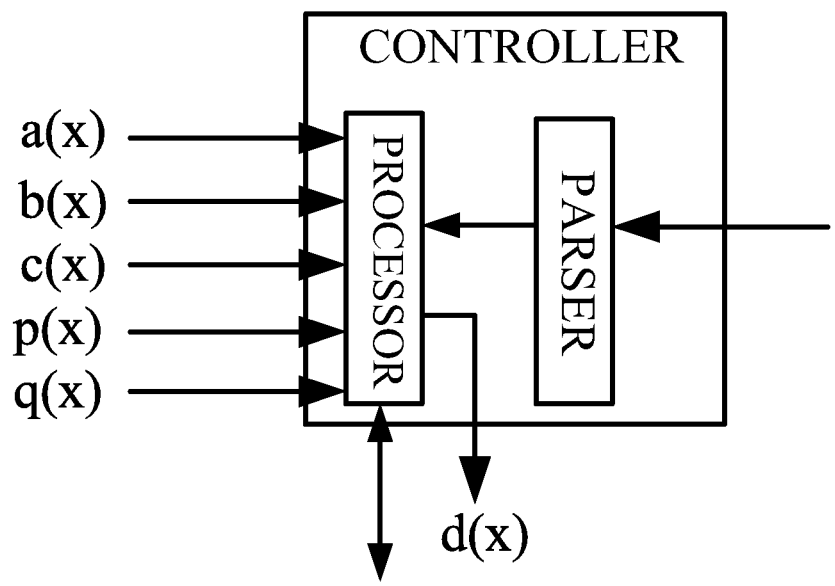
FIG. 2 is a schematic structure chart of the controller in one embodiment of the present invention.

As illustrated in FIG. 2, the controller includes a parser and a processor interconnected with each other.

The parser is configured to parse the inputted control signal. For example, when the value of the inputted control signal k is $(00)_2$, the parser will notify the processor to implement the standard basis multiplication of three operands over $GF(2^n)$; when the value of the inputted control signal k is $(01)_2$, the parser will notify the processor to implement the look-up table multiplication of three operands over $GF(2^n)$; when the value of the inputted control signal k is $(10)_2$, the parser will notify the processor to implement the standard basis multiplication of three operands over $GF((2^n)^2)$; when the value of the inputted control signal k is $(11)_2$, the parser will notify the processor to implement the look-up table multiplication of three operands over $GF((2^n)^2)$.

The processor is configured to receive the inputted control signal, and to notify the function components to implement corresponding functions based on the parsing results of the parser. For example, if the parsing result indicates that it is necessary to implement the standard basis multiplication of three operands over $GF(2^n)$, then the processor will send $a(x)$, $b(x)$, $c(x)$ and $p(x)$ to the $GF(2^n)$ standard basis multiplier and wait for feedback; once the feedback result is obtained, the processor will send the result to the output port d. If the parsing result indicates that it is necessary to implement the look-up table multiplication of three operands over $GF(2^n)$, then the processor will send $a(x)$, $b(x)$, $c(x)$ and $p(x)$ to the $GF(2^n)$ look-up table multiplier and wait for feedback; once the feedback result is obtained, the processor will send the result to the output port d. If the parsing result indicates that it is necessary to implement the standard basis multiplication of three operands over $GF((2^n)^2)$, or the look-up table multiplication of three operands over $GF((2^n)^2)$, then the processor will send $a(x)$, $b(x)$, $c(x)$, $p(x)$ and $q(x)$ to the $GF((2^n)^2)$ multiplier and wait for feedback; once the feedback result is obtained, the processor will send the result to the output port d.

Figure 3:
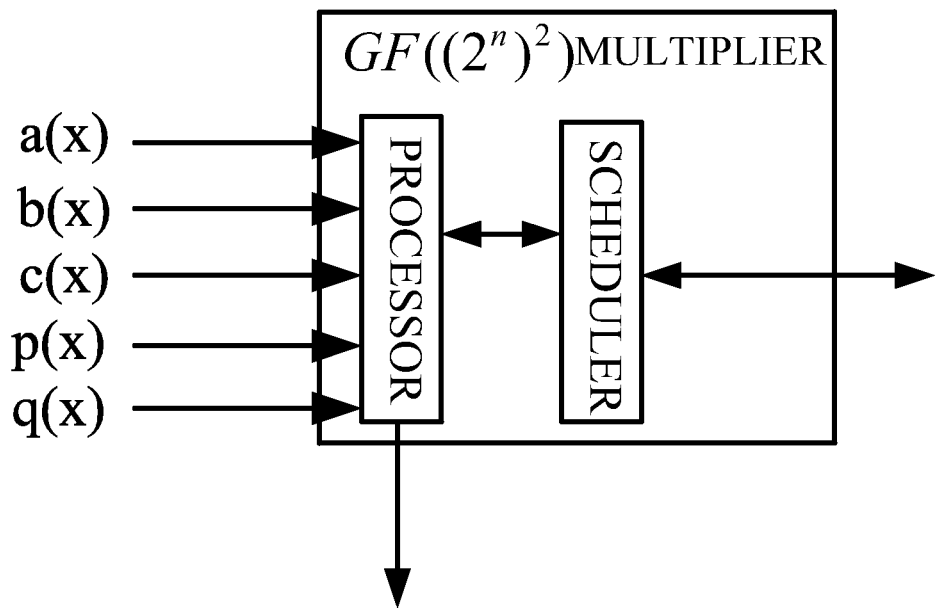
FIG. 3 is a schematic structure chart of the $GF((2^n)^2)$ multiplier in one embodiment of the present invention.

(4) The $GF((2^n)^2)$ multiplier: as illustrated in FIG. 3, the $GF((2^n)^2)$ multiplier includes a processor and a scheduler interconnected with each other; the processor is configured to implement the multiplication $(a(x) \times b(x) \times c(x)) \bmod(q(x))$ of three operands over $GF((2^n)^2)$, and the scheduler is configured to call the $GF(2^n)$ standard basis multiplier and the $GF(2^n)$ look-up table multiplier. The processor uses an XOR gate circuit to obtain the calculation results when processing the addition operation over the $GF(2^n)$ field. While processing the multiplication $(k_i(x) \cdot k_j(x) \cdot k_m(x)) \bmod(p(x))$ over the $GF(2^n)$ field, the scheduler calls the $GF(2^n)$ look-up table multiplier or $GF(2^n)$ standard basis multiplier to obtain the calculation results.

Figure 4:
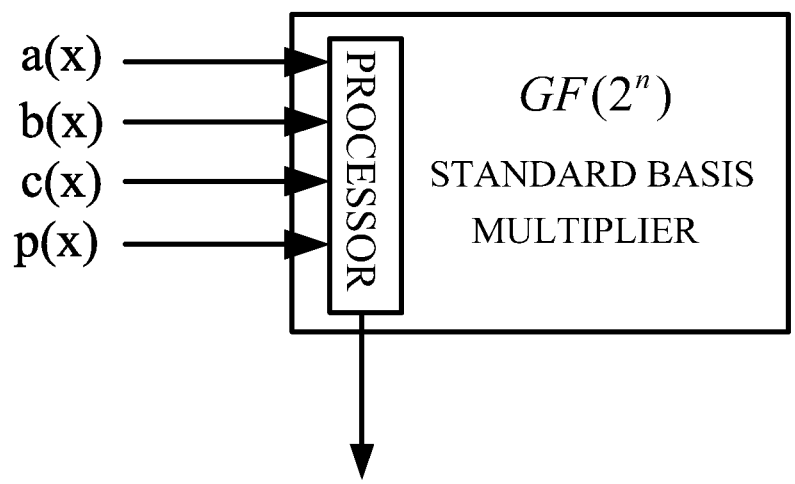
FIG. 4 is a schematic structure chart of the $GF(2^n)$ standard basis multiplier in one embodiment of the present invention.

(5) The $GF(2^n)$ standard basis multiplier: as illustrated in FIG. 4, the $GF(2^n)$ standard basis multiplier includes a internal processor configured to implement the multiplication $(a(x) \times b(x) \times c(x)) \bmod(p(x))$ of the three operands $a(x)$, $b(x)$ and $c(x)$ on a standard basis over $GF(2^n)$. The standard basis multiplication of the three operands $a(x)$, $b(x)$ and $c(x)$ over $GF(2^n)$ includes the steps of:

(5-1) Calculating $v_{ij}$ based on $$x^i \bmod p(x) = \sum_{j=0}^{n-1} v_{ij} x^j,$$

wherein $i=0, 1, \ldots, 3(n-1), j=0, 1, \ldots, n-1$.

(5-2) Calculating $S_i$ based on $$S_i = \sum_{j+k+l=i} a_j b_k c_l,$$

wherein $i=0, 1, \ldots, 3(n-1)$.

(5-3) Calculating $d_i$ based on $$d_i = \sum_{j=0}^{3(n-1)} v_{ji} S_j,$$

wherein $i=0, 1, \ldots, n-1$.

(5-4) Let $$d(x) = \sum_{i=0}^{n-1} d_i x^i,$$

then $d(x)$ is the product of the three operands $a(x)$, $b(x)$ and $c(x)$ over $GF(2^n)$, and $d(x)$ is also an element of $GF(2^n)$.

Figure 5:
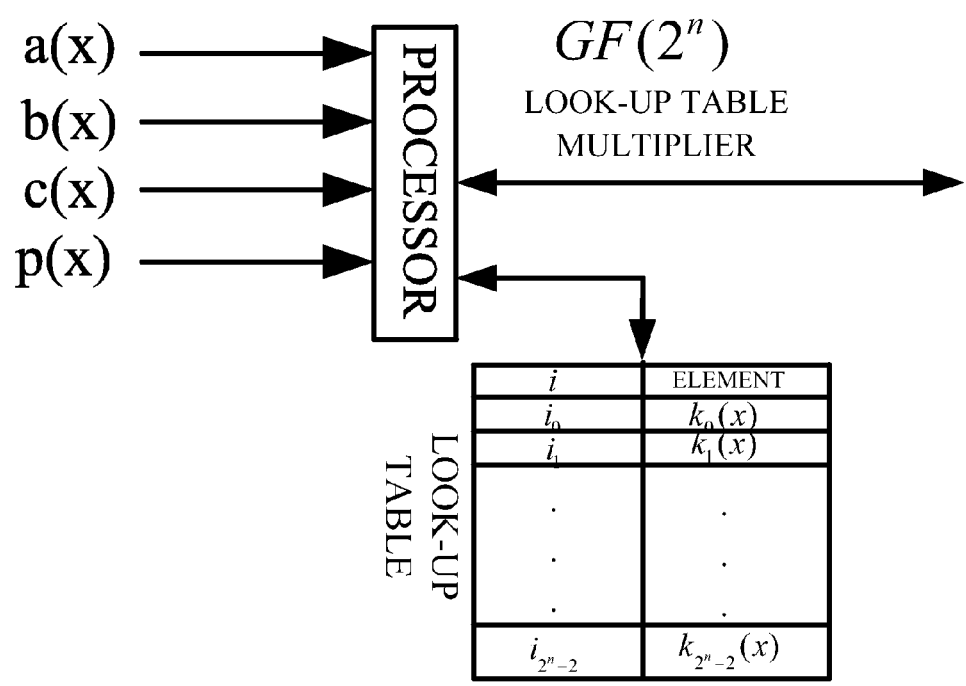
FIG. 5 is a schematic structure chart of the $GF(2^n)$ look-up table multiplier in one embodiment of the present invention.

(6) The $GF(2^n)$ look-up table multiplier: the $GF(2^n)$ look-up table multiplier is configured to implement the multiplication $(a(x) \times b(x) \times c(x)) \bmod (p(x))$ of the three operands $a(x)$, $b(x)$ and $c(x)$ over $GF(2^n)$. As illustrated in FIG. 5, the look-up table multiplier includes a processor and a $GF(2^n)$ look-up table interconnected with each other.

The $GF(2^n)$ look-up table is constructed according to the following principle. There are $2^n$ elements of $GF(2^n)$ in total. Assuming that $\alpha$ is a primitive root of $GF(2^n)$, then each nonzero element of $GF(2^n)$ may be expressed as an exponentiation of $\alpha$, i.e. as an element in $\{\alpha^0, \alpha^1, \ldots, \alpha^{2^n-2}\}$. Assuming that $k_i(x)$ is an element of $GF(2^n)$, and may be expressed as $\alpha^i$, then $\{i, k_i(x)\}$ is saved into the look-up table. When calculating $(k_i(x) \cdot k_j(x) \cdot k_m(x)) \bmod (p(x))$, the internal processor only needs to look up the exponentiations of $\alpha$ corresponding to $k_i(x), k_j(x), k_m(x)$, i.e. $i, j, m$ by searching in the constructed look-up table. Next, the value $u$ of $(i+j+m) \bmod (2^n-1)$ is calculated. Lastly, an element $k_u(x)$ of $GF(2^n)$ corresponding to $\alpha^u$ is looked up by searching in the constructed look-up table. Thus, $k_u(x)$ is the result of $(k_i(x) \cdot k_j(x) \cdot k_m(x)) \bmod (p(x))$.

Working procedure of the multiplier of the present invention is now further described taking the example of $n=4$.

Let the control signal k be $(00)_2$, the parser of the controller notifies the processor of the controller to implement the standard basis multiplication of three operands over $GF(2^4)$. The processor of the controller receives the inputted data signals $a(x), b(x), c(x)$ and $p(x)$. As the three operands, $a(x), b(x)$ and $c(x)$ have the following forms: $a(x)=a_3x^3+a_2x^2+a_1x+a_0$, $b(x)=b_3x^3+b_2x^2+b_1x+b_0$ and $c(x)=c_3x^3+c_2x^2+c_1x+c_0$, all of which are elements of $GF(2^4)$; $p(x)$ has a fixed inputting form: $p(x)=x^4+p_3x^3+p_2x^2+p_1x+1$, and it is an irreducible polynomial selected over $GF(2^4)$. $a_3, a_2, a_1, a_0, b_3, b_2, b_1, b_0, c_3, c_2, c_1, c_0$ and $p_3, p_2, p_1$ are all elements of $GF(2)$.

The processor of the controller sends $a(x), b(x), c(x)$ and $p(x)$ to the $GF(2^n)$ standard basis multiplier and waits for feedback results. At this time, the $GF(2^n)$ standard basis multiplier starts its processor, and implements the multiplication of three operands over $GF(2^n)$, with the process as follows:

calculating $v_{ij}$ based on $$x^i \bmod p(x) = \sum_{j=0}^{3} v_{ij} x^j,$$

wherein $i=0, 1, \ldots, 9, j=0, 1, \ldots, 3$;

calculating $S_i$ based on $$S_i = \sum_{j+k+l=i} a_j b_k c_l,$$

wherein $i=0, 1, \ldots, 9$;

calculating $d_i$ based on $$d_i = \sum_{j=0}^{9} v_{ji} S_j,$$

wherein $i=0, 1, \ldots, 3$.

$$\sum_{i=0}^{3} d_i x^i$$

is the product of three operands over $GF(2^4)$, and the $GF(2^n)$ standard basis multiplier sends this result to the controller; the controller sends the result to the output port d.

Let the control signal k be $(01)_2$, the parser of the controller notifies the processor of the controller to implement the look-up table multiplication of three operands over $GF(2^n)$. The processor of the controller receives the inputted data signals $a(x), b(x), c(x)$ and $p(x)$. As the three operands, $a(x), b(x)$ and $c(x)$ have the following forms: $a(x)=a_3x^3+a_2x^2+a_1x+a_0$, $b(x)=b_3x^3+b_2x^2+b_1x+b_0$ and $c(x)=c_3x^3+c_2x^2+c_1x+c_0$, all of which are elements of $GF(2^4)$; $p(x)$ has a fixed inputting form: $p(x)=x^4+p_3x^3+p_2x^2+p_1x+1$, and it is an irreducible polynomial selected over $GF(2^4)$. $a_3, a_2, a_1, a_0, b_3, b_2, b_1, b_0, c_3, c_2, c_1, c_0$ and $p_3, p_2, p_1$ are all elements of $GF(2)$.

The processor of the controller sends $a(x), b(x), c(x)$ and $p(x)$ to the $GF(2^n)$ look-up table multiplier and waits for feedback results. The $GF(2^n)$ look-up table multiplier starts its processor, and implements the multiplication of three operands over $GF(2^n)$, with the detailed process as follows:

The processor of the $GF(2^n)$ look-up table multiplier constructs the $GF(2^4)$ look-up table according to the following principle. There are sixteen elements in $GF(2^4)$ in total. Assuming that $\alpha$ is a primitive root of $GF(2^4)$, then each nonzero element of $GF(2^4)$ may be expressed as an exponentiation of $\alpha$, i.e. as an element of $\{\alpha^0, \alpha^1, \ldots, \alpha^{14}\}$. Assuming that $k_i(x)$ is an element of $GF(2^4)$, and may be expressed as $\alpha^i$, then $\{i, k_i(x)\}$ is saved into the look-up table.

When the processor of the $GF(2^n)$ look-up table multiplier is calculating $(k_i(x) \cdot k_j(x) \cdot k_m(x)) \bmod (p(x))$, the exponentiations of α respectively corresponding to $k_i(x)$, $k_j(x)$, $k_m(x)$, i.e. i, j, m, are looked up by searching in the constructed look-up table. Next, the value u of $(i+j+m) \mod(15)$ is calculated. Lastly, an element $k_u(x)$ corresponding to $\alpha^u$ in $GF(2^4)$ is looked up by searching in the look-up table. Thus, $k_u(x)$ is the result of $(k_i(x) \cdot k_j(x) \cdot k_m(x)) \mod(p(x))$. The $GF(2^n)$ look-up table multiplier sends the calculation result to the controller, and the controller outputs this result into the output port d.

Let the control signal k be $(10)_2$ or $(11)_2$, the parser of the controller notifies the processor of the controller to implement the standard basis multiplication or the look-up table multiplication of three operands over $GF((2^n)^2)$. The processor of the controller receives the inputted data signals $a(x)$, $b(x)$, $c(x)$, $p(x)$ and $q(x)$. As the three operands, $a(x)$, $b(x)$ and $c(x)$ have the following forms: $a(x)=a_h x+a_l$, $b(x)=b_h x+b_l$ and $c(x)=c_h x+c_l$, all of which are elements of $GF((2^4)^2)$; $a_h$, $a_l$, $b_h$, $b_l$, $c_h$ and $c_l$ are all elements of the $GF(2^4)$ finite field; $p(x)$ and $q(x)$, as the inputted data signals, are irreducible polynomials selected over $GF(2^4)$ and $GF((2^4)^2)$, and have the following forms: $p(x)=x^4+x+1$ and $q(x)=x^2+x+e$, wherein e=9 is a constant of $GF(2^4)$.

The processor of the controller sends $a(x)$, $b(x)$, $c(x)$, $p(x)$ and $q(x)$ to the $GF((2^n)^2)$ multiplier, and waits for the feedback result. At this time, the $GF((2^n)^2)$ multiplier starts its processor, and implement the multiplication of three operands over $GF((2^n)^2)$, calculating respectively:

$$d_h = e \cdot a_h \cdot b_h \cdot c_h + a_h \cdot b_h \cdot c_l + a_h \cdot b_l \cdot c_h + a_l \cdot b_h \cdot c_h + a_h \cdot b_h \cdot c_l + a_l \cdot b_l \cdot c_h + a_h \cdot b_l \cdot c_l + a_l \cdot b_h \cdot c_l, d_l = e(a_h \cdot b_h \cdot c_h + a_h \cdot b_l \cdot c_h + a_l \cdot b_h \cdot c_h + a_l \cdot b_h \cdot c_l) + a_l \cdot b_l \cdot c_l.$$

The operator · is the multiplication operation over the sub-field $GF(2^4)$, and the operator + is the addition operation over the sub-field $GF(2^4)$. When the processor of the $GF((2^n)^2)$ multiplier is processing the multiplication operation over the sub-field $GF(2^4)$, it performs the calculation by starting the internal scheduler. At this time, the internal scheduler will need to send the three operands to the $GF(2^n)$ standard basis multiplier or the $GF(2^n)$ look-up table multiplier (i.e. sending to the $GF(2^n)$ standard basis multiplier when k is $(10)_2$, and sending to the $GF(2^n)$ look-up table multiplier when k is $(11)_2$), and wait for the feedback result. Once the $GF(2^n)$ standard basis multiplier or the $GF(2^n)$ look-up table multiplier has completed the necessary calculating and sent the result to the scheduler, the scheduler will immediately send the result to the processor of the $GF((2^n)^2)$ multiplier. When the processor of the $GF((2^n)^2)$ multiplier is processing the addition operation over the sub-field $GF(2^4)$, it obtains the calculating result by an XOR gate circuit. $d(x)=d_h x+d_l$ is the calculating result of $(a(x) \times b(x) \times c(x)) \mod(q(x))$, and it is an element of $GF((2^4)^2)$; $d_h$ and $d_l$ are elements of $GF(2^4)$. The internal processor sends the result to the controller, and the controller sends the result to the output port d.

The above embodiments are preferred embodiments of the present invention, which, however, is not intended to limit the implementation of the present invention. All of the variations, modifications, alternatives, combinations, simplifications that are not apart from the spirit of the invention shall be deemed as equivalences to those skilled in the art, and are within the protection scope of the present invention.

What is claimed is:

1. A composite finite field multiplier, comprising:
    an input port, configured to input an operand $a(x)$, an operand $b(x)$, an operand $c(x)$, an irreducible polynomial $p(x)$ selected over the $GF(2^n)$ field, an irreducible polynomial $q(x)$ selected over the $GF((2^n)^m)$ field and a control signal k;
    a $GF(2^n)$ standard basis multiplier, configured to implement the multiplication $(a(x) \times b(x) \times c(x)) \mod(p(x))$ of the three operands $a(x)$, $b(x)$ and $c(x)$ on the standard basis over $GF(2^n)$;
    a $GF(2^n)$ look-up table multiplier, configured to implement the multiplication $(a(x) \times b(x) \times c(x)) \mod(p(x))$ of the three operands $a(x)$, $b(x)$ and $c(x)$ based on the look-up table over $GF(2^n)$;
    a $GF((2^n)^2)$ multiplier, comprising a first processor and a scheduler interconnected with each other; the first processor is configured to implement the multiplication $(a(x) \times b(x) \times c(x)) \mod(q(x))$ of the three operands $a(x)$, $b(x)$ and $c(x)$ over $GF((2^n)^2)$, when processing the addition operation over the $GF(2^n)$ field, using an XOR gate circuit included in the first processor to obtain an intermediate calculation result, while when processing the multiplication over the $GF(2^n)$ field, the scheduler calls the $GF(2^n)$ look-up table multiplier or $GF(2^n)$ standard basis multiplier to obtain an intermediate calculation result;
    a controller, configured to parse the control signal k and control the $GF((2^n)^2)$ multiplier, the $GF(2^n)$ standard basis multiplier and the $GF(2^n)$ look-up table multiplier based on the parsing result;
    an output port, configured to output the results;
    wherein the controller is connected respectively to the input port, the output port, the $GF((2^n)^2)$ multiplier, the $GF(2^n)$ standard basis multiplier and the $GF(2^n)$ look-up table multiplier;
    the $GF((2^n)^2)$ multiplier is connected respectively to the $GF(2^n)$ standard basis multiplier and the $GF(2^n)$ look-up table multiplier.

2. The composite finite field multiplier of claim 1, wherein the control signal k is a (2-bit) value, and has four types of binary value of $(00)_2$, $(01)_2$, $(10)_2$ and $(11)_2$.

3. The composite finite field multiplier of claim 1, wherein the controller comprises a parser and a second processor interconnected with each other;
    the parser is configured to parse the inputted control signal;
    the second processor is configured to receive the data signal from the input port, and, according to a parsing result from the parser, to notify the $GF((2^n)^2)$ multiplier, the $GF(2^n)$ standard basis multiplier and the $GF(2^n)$ look-up table multiplier to perform a function corresponding to the parsing result.

4. The composite finite field multiplier of claim 1, wherein the operand $a(x)$, operand $b(x)$ and operand $c(x)$ have the forms of:

$$a(x)=a_{n-1}x^{n-1}+a_{n-2}x^{n-2}+\ldots+a_0;$$

$$b(x)=b_{n-1}x^{n-1}+b_{n-2}x^{n-2}+\ldots+b_0;$$

$$c(x)=c_{n-1}x^{n-1}+c_{n-2}x^{n-2}+\ldots+c_0.$$

5. The composite finite field multiplier of claim 1, wherein the irreducible polynomial $p(x)$ selected over the $GF(2^n)$ field has the form of:

$$p(x)=x^n+p_{n-1}x^{n-1}+p_{n-2}x^{n-2}+\ldots+p_1 x+1.$$

6. The composite finite field multiplier of claim 1, wherein the irreducible polynomial $q(x)$ selected over the $GF((2^n)^m)$ field has the form of:

$$q(x)=q_m x^m+q_{m-1}x^{m-1}+\ldots+q_0.$$

\* \* \* \* \*